United States Patent [19]
Okabe

[11] Patent Number: 5,940,184
[45] Date of Patent: Aug. 17, 1999

[54] PHOTOGRAPHING METHOD AND APPARATUS USING A PHOTOCONDUCTIVE LAYER FORMED ON AN ELECTRODE AND A LIQUID CRYSTAL POLYMER COMPOSITE

[75] Inventor: Masato Okabe, Tokyo, Japan

[73] Assignee: Dia Nippon Printing Co., LTD., Tokyo, Japan

[21] Appl. No.: 08/623,186

[22] Filed: Mar. 28, 1996

[30] Foreign Application Priority Data

Mar. 28, 1995 [JP] Japan .................................. 7-069668

[51] Int. Cl.⁶ .............................. H04N 1/00; G01D 9/42
[52] U.S. Cl. ........................................ 358/296; 347/238
[58] Field of Search ................................ 358/296, 302, 358/335, 345; 347/233, 238; 348/38, 50, 87; 359/36, 55

[56] References Cited

U.S. PATENT DOCUMENTS

| | | | |
|---|---|---|---|
| 4,310,858 | 1/1982 | Hareng et al. | 358/302 |
| 4,899,224 | 2/1990 | Ooba et al. | 347/131 X |
| 5,359,206 | 10/1994 | Yamamoto et al. | 348/702 X |

*Primary Examiner*—Eric Frahm
*Attorney, Agent, or Firm*—Sughrue, Mion, Zinn, Macpeak & Seas, PLLC

[57] ABSTRACT

A photographic method for controlling characteristics of an image to be recorded by changing the conditions for voltage application and achieves image recording by setting application voltage in accordance with image characteristics as desired. The range of external application voltage is set according to resistance of the liquid crystal medium, threshold voltage of the liquid crystal medium, and base current of a photo sensor, and the application voltage is changed according to the desired image characteristics within the preset range.

3 Claims, 11 Drawing Sheets

Electric current value 33 msec after starting of light irradiation

PHOTOGRAPHING METHOD AND APPARATUS USING A PHOTOCONDUCTIVE LAYER FORMED ON AN ELECTRODE AND A LIQUID CRYSTAL POLYMER COMPOSITE

BACKGROUND OF THE INVENTION

The present invention relates to a photographing method and a photographing apparatus using a photo sensor having a photoconductive layer formed on an electrode and a liquid crystal polymer composite, where liquid crystal is dispersed and fixed in resin.

It is known that a liquid crystal polymer composite can be prepared by mixing liquid crystal with resin and by dissolving it in a common solvent, and after this solution is coated by a spinner, the solvent is evaporated and dried, and the liquid crystal phase and the resin phase are separated by phase separation. The liquid crystal polymer composite can also be prepared by dissolving liquid crystal and monomer or oligomer of UV-setting resin in a common solvent, and under the condition where the mixture of the liquid crystal and the monomer is dried at a temperature to form an isotropic phase, ultraviolet ray is irradiated to polymerize the monomer, and the resin phase and the liquid crystal phase are separated by phase separation.

In the phase separation of the liquid crystal phase and the resin phase, liquid crystal phase in spherical or other shape is dispersed in the resin in some cases, or resin balls are dispersed in the liquid crystal phase with a skin layer on the surface in some other cases.

Refractive index in the orienting direction of the liquid crystal phase is adjusted in such manner that it becomes approximately equal to the refractive index of the resin. Because the refractive index in the non-oriented status is different from the refractive index of the resin, light is scattered at interface between the liquid crystal phase and the resin under a non-oriented condition immediately after preparation of the liquid crystal medium, and transmittance of the medium is decreased. When electric field is applied on the liquid crystal medium and the liquid crystal is oriented in a direction perpendicular to the plane of the medium, scattering is eliminated, and the light is transmitted.

If smectic liquid crystal having memory property is used as the liquid crystal, even when electic field is applied to orient the liquid crystal and electric field is then removed, the oriented status is maintained. When it is heated to a temperature where the liquid crystal phase is turned to isotropic phase and is then cooled down, it can be restored to the non-oriented status.

To record an image information on the liquid crystal medium, a transparent electrode 22 and a liquid crystal polymer composite layer 23 are sequentially formed on a transparent support member 21 to prepare a liquid crystal recording medium 20, and a transparent electrode 12 and a photoconductive layer 13 are sequentially formed on a transparent support member 11 to prepare a photo sensor 10 as shown in FIG. 1. The liquid crystal recording medium 20 and the photo sensor 10 are placed at face-to-face position with an air gap between them. Then, voltage is applied from a power source 30 between the two electrodes, and image exposure is performed on the photo sensor 10. The electric field on the liquid crystal is changed according to intensity of the exposure. Liquid crystal is oriented according to the electric field, and an image information corresponding to the image exposure can be recorded.

There is another method to record an image on a liquid crystal recording medium using a photo sensor: As shown in FIG. 2(a), a transparent electrode 12, a photoconductive layer 13, a liquid crystal polymer composite layer 23, and an upper electrode 22 are sequentially formed on a transparent support member 11 to prepare an integrated type recording medium. Or, as shown in FIG. 2(b), a transparent electrode 12, a photoconductive layer 13, a dielectric intermediate layer 14, a liquid crystal polymer composite layer 23, and an upper electrode 22 are sequentially laminated to prepare an integrated type recording medium. Image exposure is performed with the photo sensor by the same procedure, and by applying voltage between the two electrodes from the power source 30, an image information can be recorded on the liquid crystal layer.

The image information recorded on the liquid crystal medium can be converted to electric signal by an image reading device as shown in FIG. 3. In FIG. 3, illumination light with adequate wavelength selected in an optical system comprising a light source 40, an IR cut filter 41, a band-pass filter 42, and an illumination lens 43 is irradiated to a liquid crystal recording medium 20. The light passing through in the liquid crystal medium is adjusted in such manner that an image is formed on a CCD line sensor 50 through an image forming lens 44. The liquid crystal recording medium is placed on a movable stage (not shown), and said stage is controlled by a stepping motor. By converting the transmitted light by a CCD sensor to electric signal as the stage is moved, the image information is read.

The image signal converted to electric signal is outputted to a CRT or a printer when necessary.

In case it is attempted to record an image by the exposure under voltage application as described above, satisfactory image may not be obtained unless the image is recorded under adequate voltage application. Also, because the characteristics of the image to be recorded are changed according to the application voltage, an image of the desired characteristics may not be recorded unless correlation between the application voltage and the characteristics of the image to be recorded are well identifed.

To solve the above problems, it is an object of the present invention to provide a photographing method and a photographing apparatus, by which it is possible to control the recording characteristics of an image to be recorded by changing voltage applying conditions and to record the image by setting the application voltage to match the desired characteristics of the image.

To attain the above object, the method for recording image information according to the present invention comprises a photo sensor having a photoconductive layer formed on a transparent electrode and a liquid crystal recording medium having a liquid crystal polymer composite layer consisting of resin and liquid crystal formed on an electrode, said photo sensor and said liquid crystal recording medium placed face-to-face with an air gap therebetween to form a separate type information recording medium, image exposure is performed to the photo sensor, said liquid crystal is oriented by applying voltage between the two electrodes, and image information is recorded, whereby an application voltage, at which initial distribution voltage to the liquid crystal medium determined by capacities of the liquid crystal medium and the photo sensor is ½ or less of threshold voltage of the liquid crystal medium, is defined as an upper limit application voltage, a sum V1 of saturation voltage of the liquid crystal medium and breakdown voltage, or an application voltage V2 where equilibrium potential of the liquid crystal medium obtained from resistance of the photo sensor based on base current of the photo sensor and from resistance of the liquid crystal medium is higher than the threshold voltage, whichever is higher, is defined as a lower limit application voltage, and an image is recorded by setting the application voltage between the upper limit application voltage and the lower limit application voltage.

The present invention is characterized in that image characteristics are controlled by changing the application voltage within the preset range.

Also, the apparatus for recording image information according to the present invention comprises a photo sensor having a photoconductive layer formed on a transparent electrode and a liquid crystal recording medium having a liquid crystal polymer composite layer consisting of resin and liquid crystal formed on an electrode, said photo sensor and said liquid crystal recording medium placed face-to-face with an air gap therebetween to form a separate type information recording medium, image exposure is performed to the photo sensor, said liquid crystal is oriented by applying voltage between the two electrodes, and image information is recorded, whereby there are provided means for measuring resistance of the liquid crystal medium, means for determining base current of the photo sensor, and control means for setting application voltage range, said control means calculates an upper limit application voltage, defined as the voltage, at which initial distribution voltage to the liquid crystal medium determined by capacities of the liquid crystal medium and the photo sensor is ½ or less of the threshold voltage of the liquid crystal medium, and also calculates a lower limit application voltage as a sum V1 of saturation voltage of the liquid crystal medium and breakdown voltage, or an application voltage V2 where equilibrium potential of the liquid crystal medium obtained from resistance of the photo sensor based on base current of the photo sensor and from resistance of the liquid crystal medium is higher than the threshold voltage, whichever is higher, and the application voltage is controlled within the range of said upper limit application voltage and said lower limit application voltage.

According to the present invention, the range of the external application voltage is set at least based on the resistance of the liquid crystal, threshold voltage of the liquid crystal medium, and base current of the photo sensor, and by changing the application voltage in accordance with the desired image characteristics within the preset range, photographing can be achieved with the desired image characteristics.

Further, it is preferable to provide a coating layer on the surface of the fired porous ceramic molded material.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DETAILED DESCRIPTION OF THE PREFERRED EMBODIMENT

First, description will be given on a method for applying voltage according to the present invention.

Figure 4:
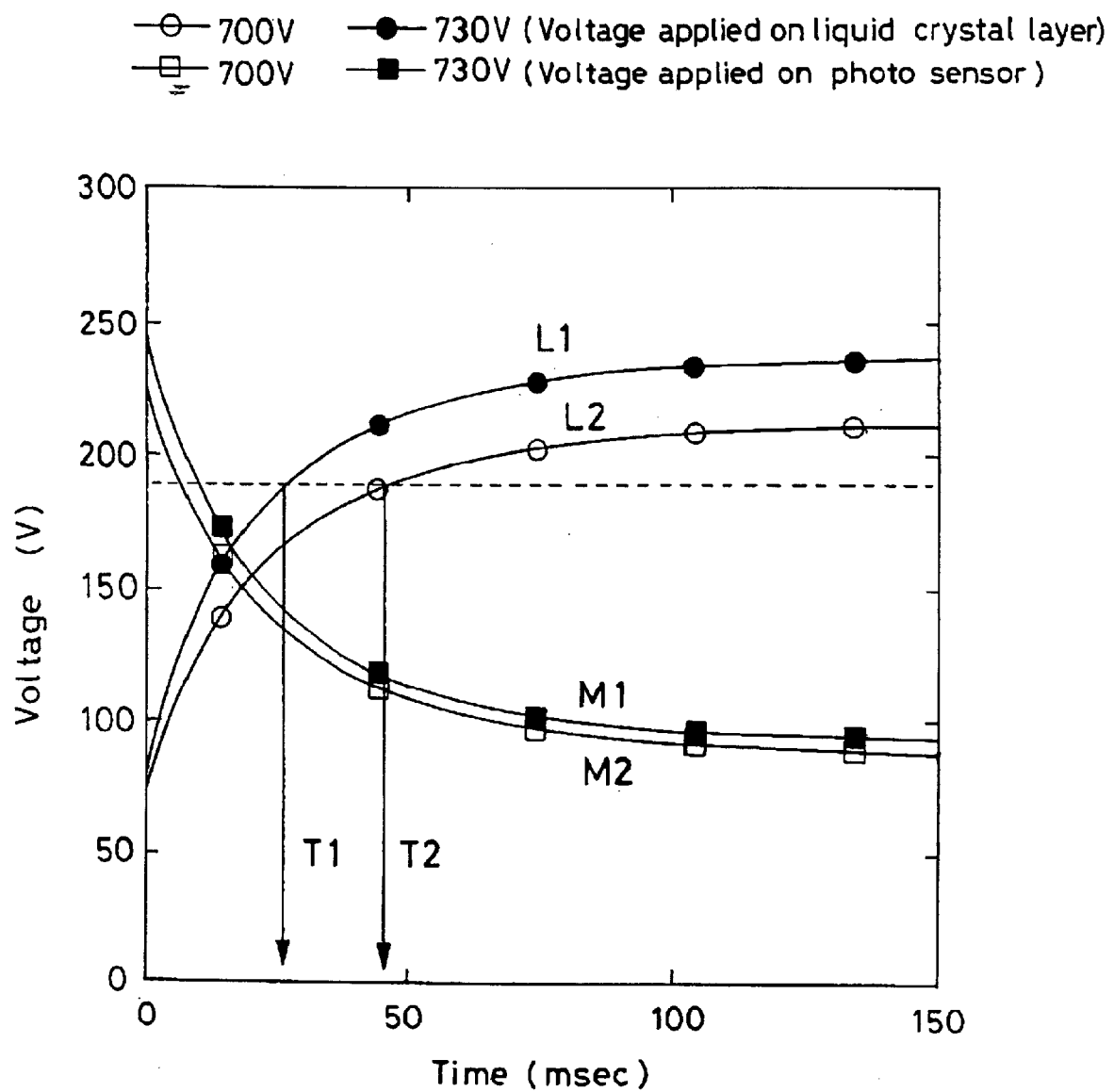
FIG. 4 is a diagram showing change of voltage applied to the liquid crystal medium and the photo sensor on a non-exposed portion.
Figure 5:
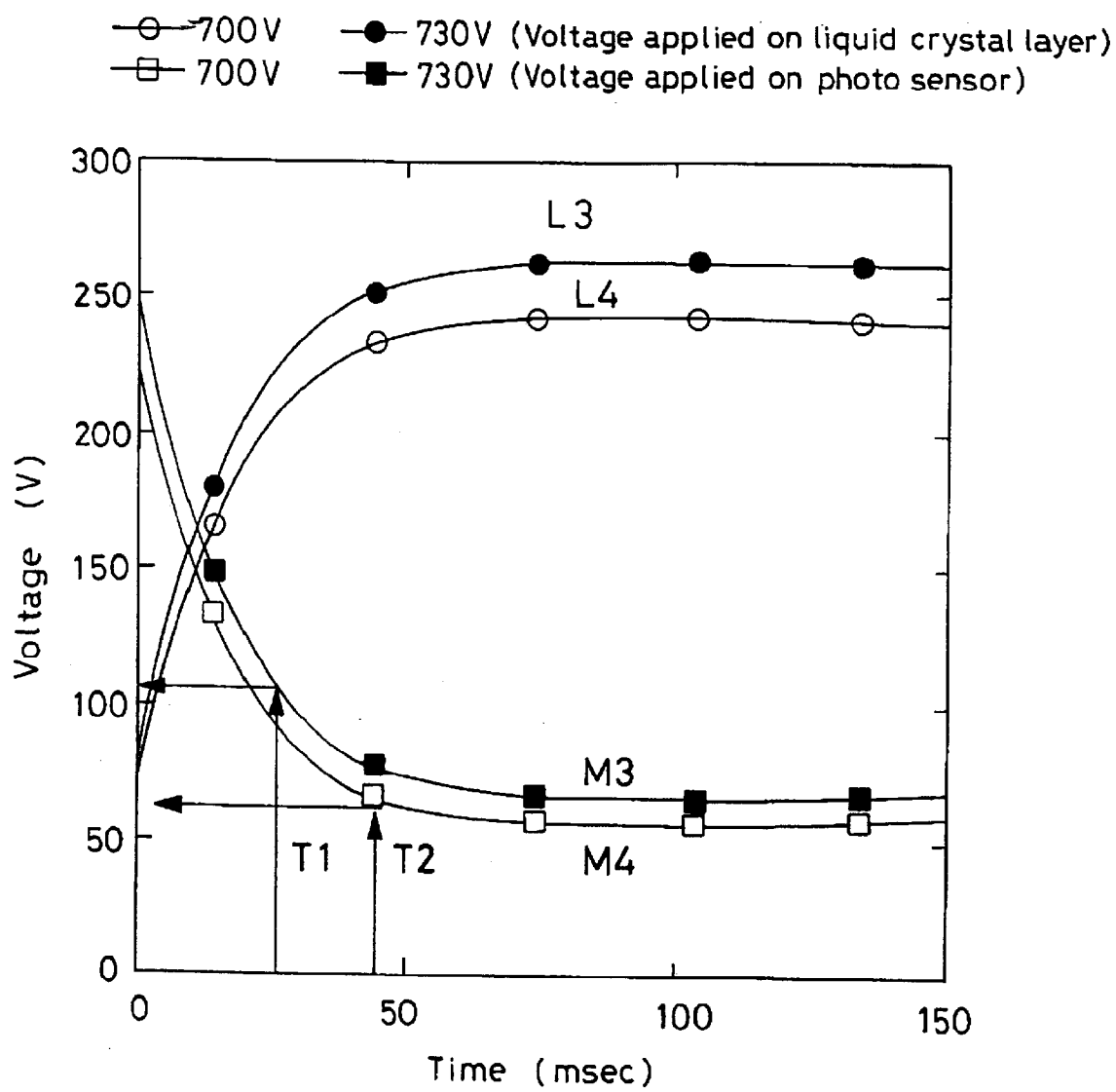
FIG. 5 is a diagram showing change of voltage applied to the liquid crystal medium and the photo sensor on an exposed portion.

FIG. 4 and FIG. 5 each represents the results of simulation to simulate the change over time of the voltage applied to a liquid crystal medium and a photo sensor.

Physical property values used in the simulation are as follows:

Liquid crystal medium: Film thickness 6 $\mu$m; Resistivity 2.7×10$^{11}$ $\Omega$·cm$_j$ Photo sensor: Film thickness 10 $\mu$m; Base current 1.7× 10$^{-6}$ A/cm$^2$ (Base current: the current flowing when voltage of 100 V is applied under non-exposure condition) FIG. 4 shows the change over time of the voltage on the non-exposed portion, and FIG. 5 represents the change over time of the voltage on the exposed portion. In FIG. 4, L1 and L2 each represents the change over time of the voltage of the liquid crystal medium at the application voltage of 730 V and 700 V respectively, and M1 and M2 each represents the change over time of the voltage applied on the photo sensor at the application voltage of 730 V and 700 V respectively.

If it is assumed that threshold voltage of the liquid crystal medium (voltage where the liquid crystal medium is oriented) is 180 V in the system of the present invention, voltage is stopped when the voltage applied to the liquid crystal medium reaches the threshold voltage on the non-exposed portion. Before it reaches the threshold voltage, orientation of the liquid crystal is not sufficient, and necessary contrast cannot be obtained. If it is over the threshold voltage, the non-exposed portion is oriented, and image quality is reduced. In FIG. 4, the threshold voltage is reached at the time T1 (about 30 msec) in case the application voltage is 730 V and at the time T2 (about 45 msec) in case it is 700 V, and the voltage application is stopped.

FIG. 5 shows the change of voltage on the exposed portion, where L3 and L4 represent the change over time of the voltage applied on the liquid crystal medium when the application voltage is 700 V and 730 V respectively, and M3 and M4 represent the change over time of the voltage applied to the photo sensor when the application voltage is 700 V and 730 V respectively. In the simulation, the amount of the light to be irradiated is changed to match the change of the application voltage, and it is adjusted in such manner that the potential differences (contrast) of a bright portion and a dark portion are equal to each other when the voltage on the non-exposed portion reaches the threshold voltage. Here, the amount of exposure on the exposed portion is adjusted so that the voltage on the exposed portion is about 230 V when the voltage on the non-exposed portion reaches 180 V.

Taking notice of the voltage, which is applied on the photo sensor when the voltage application is stopped, it is about 60 V (the voltage at the time T2) in case the application voltage is 700 V, while it is about 105 V (voltage at the time T2) when the application voltage is 730 V.

Figure 6:
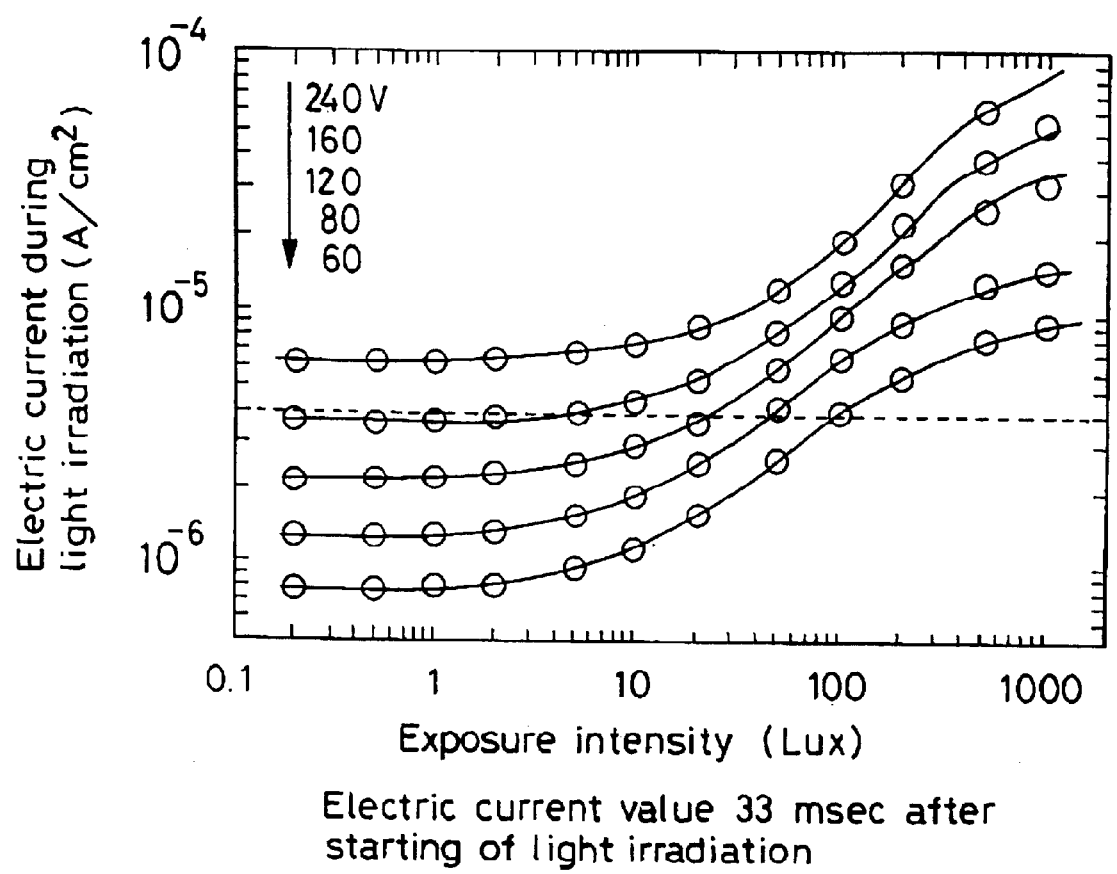
FIG. 6 is a diagram showing relationship between exposure intensity and value of photo sensor current.

FIG. 6 shows the relationship between the current when light is irradiated on the photo sensor (sum of photoelectric current and base curent) and intensity of the irradiated light.

Figure 7:
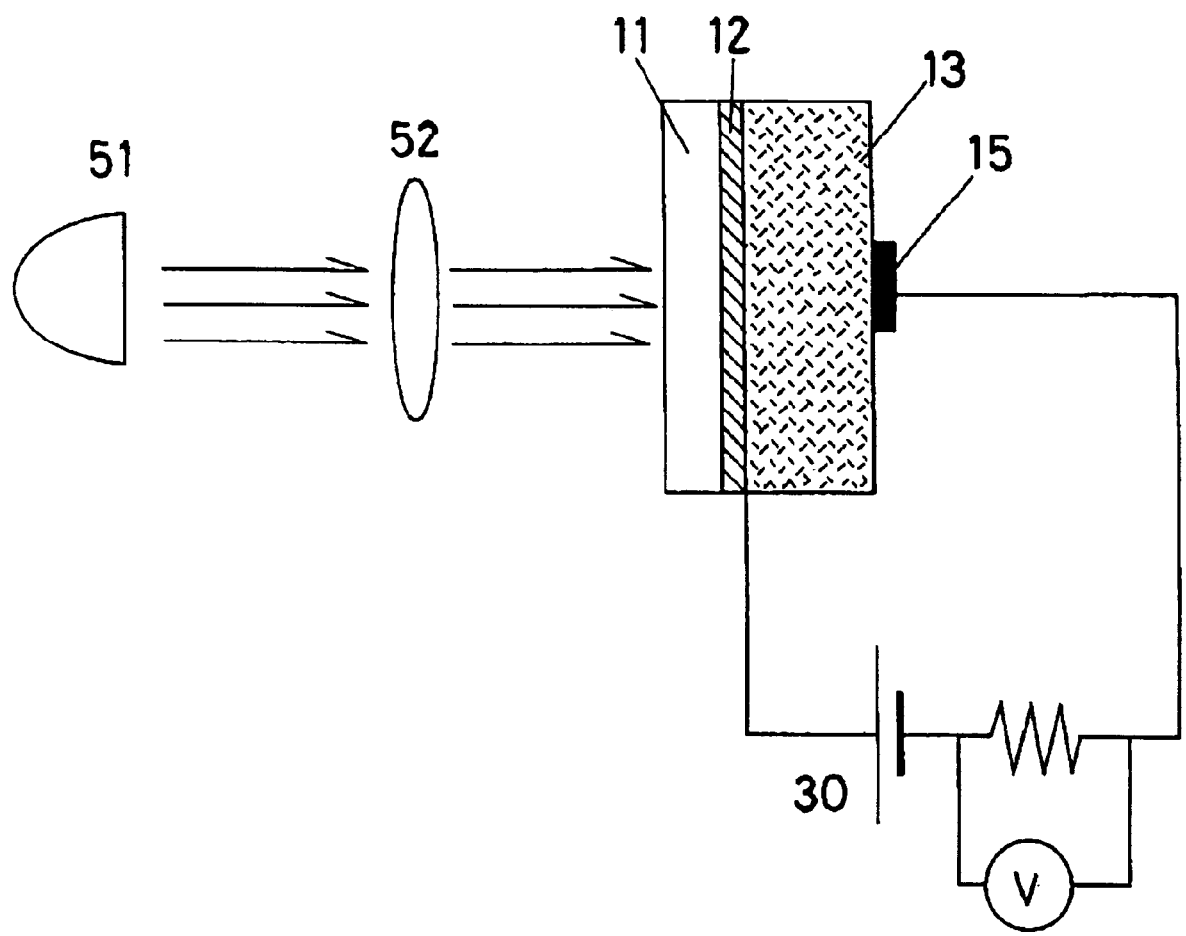
FIG. 7 is a drawing for explaining a method for measuring photo sensor current.
Figure 8:
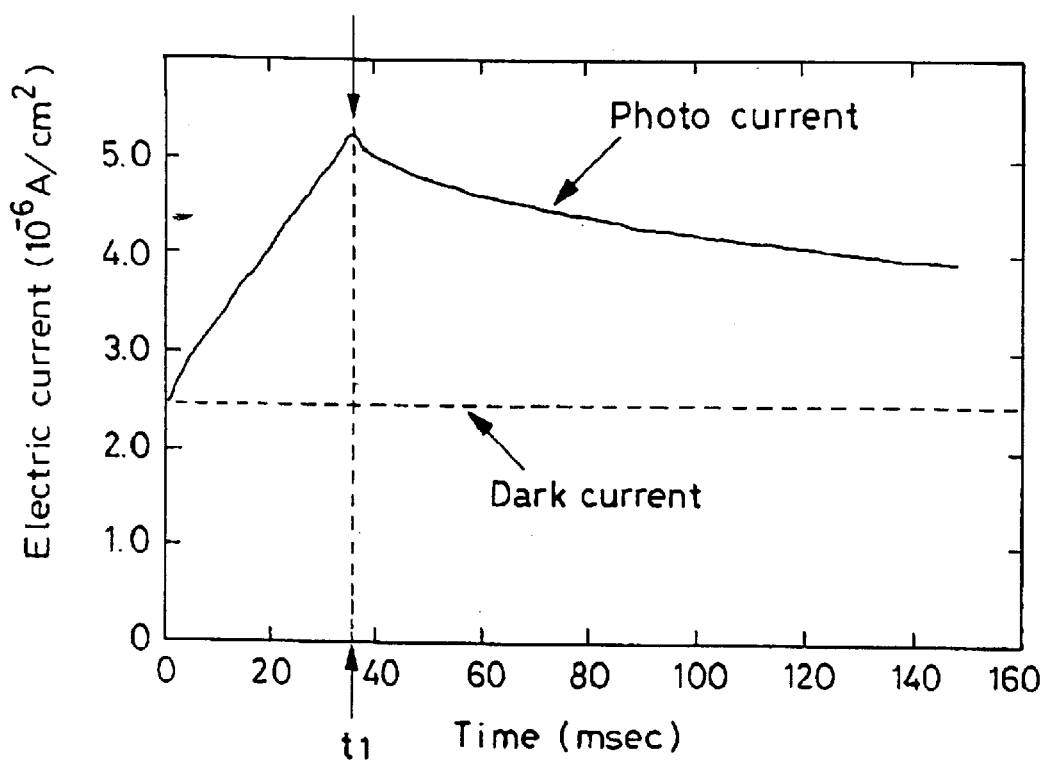
FIG. 8 is a diagram showing change of current value of the photo sensor.

The current flowing in the photo sensor can be measured, for example, as shown in FIG. 7, by arranging a gold electrode 15 on the surface of the photo sensor and by applying voltage between this and the transparent electrode 12 from the power source 30. In this case, the results of the measurement when light of a given intensity is irradiated for a given period of time from the direction of the transparent electrode of the photo sensor using the light source 51 and the optical shutter 52 are as shown in FIG. 8.

To the photo sensor, light was irradiated for 33 msec with a given voltage applied. As the time given on abscissa in the graph, the time when light irradiation was started was set to: t=0. Also, it was assumed that the current value when t=0 was dark current (base current) value, and current value in the graph is shown by the value per unit area (1 cm$^2$). After the light irradiation was started, the current value increased as time elapsed, and it gradually attenuated after the completion of light irradiation. In this way, photoelectric current continues to change during voltage application. In case light irradiation time is 33 msec, photoelectric current reaches the maximum after 33 msec and it gradually attenuates after the completion of light irradiation. Thus, photoelectric current is incessantly changing and is not constant. Hereinafter, it is supposed that the value of photoelectric current when t=33 msec (when the voltage application is stopped) is the photoelectric current value. The photoelectric current is dependent on light intensity of the irradiated light, and it increases as the intensity increases.

In the meantime, the value of the current flowing to the photo sensor as necessary for orienting the liquid crystal medium is determined by resistance and capacity of the liquid crystal medium. For example, if it is supposed to be 4×10$^{-6}$A/cm$^2$ as shown by the curves in FIG. 6, irradiation intensity of about 80 lux is required when the voltage at the stopping of voltage application is 60 V, while the above current value can be obtained at about 20 lux in case the voltage at the stopping of the voltage application is 105 V. The current value during light irradiation is also dependent upon the time from the starting of light irradiation. To obtain the same current value, it is necessary to expose more to light when voltage is low. For this reason, by changing the application voltage, the voltage on the photo sensor at the stopping of voltage application is changed. The amount of exposure necessary to orient the liquid crystal is changed, and this leads to the change of the characteristics of the image to be recorded.

Figure 9:
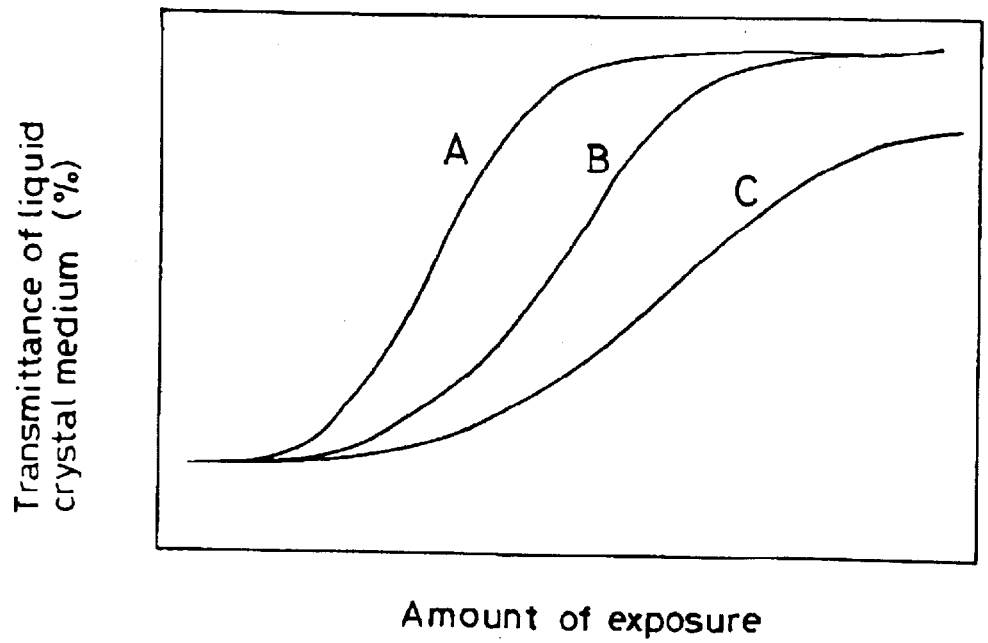
FIG. 9 represents a diagram showing relationship between amount of exposure and transmittance of the liquid crystal medium.

FIG. 9 shows transmittance characteristics of the liquid crystal to the amount of exposure when the application voltage is changed. The characteristics A are the highest, and next follow the chracteristics B and C in this order. In the characteristics A, latitude is narrow and this is suitable for the image such as characters, and the characteristics B are suitable for scenery image. By selecting the application voltage, soft image or hard image can be chosen according to each purpose. In the characteristics C, the application voltage is too low, and it does not reach saturation voltage (not sufficiently oriented). Therefore, S/N ratio is poor and it is not suitable for the purpose. In this way, by changing the application voltage, it is possible to control the characteristics of the image to be recorded (latitude) to suit each purpose.

Next, description will be given on a method for setting the application voltage.

First, description is given on threshold voltage and saturation voltage when the application voltage is set.

Figure 10:
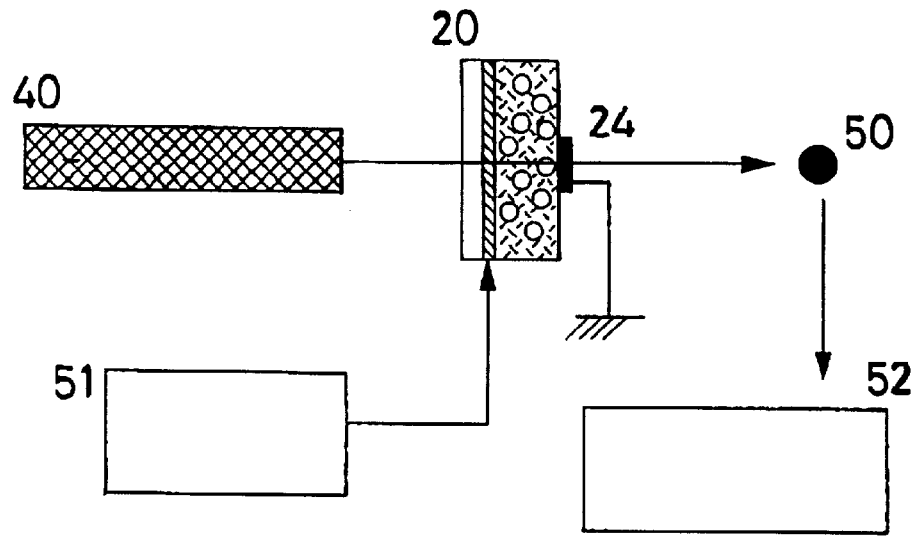
FIG. 10 is a schematical drawing of an apparatus for measuring threshold voltage and saturation voltage.

FIG. 10 is a block diagram of an apparatus for determining orientation status (transmittance of the liquid crystal by changing the voltage applied to the liquid crystal medium. A gold electrode (semitransparent) 24 is attached on the surface of the liquid crystal medium, and voltage is applied between the transparent electrode 22 and the gold electrode 24 using a voltage generator 51. By irradiating laser beam from an argon laser (448 nm) 40, the transmitted light is detected by a sensor 50, and the detection result is monitored using an oscilloscope 52.

Figure 11:
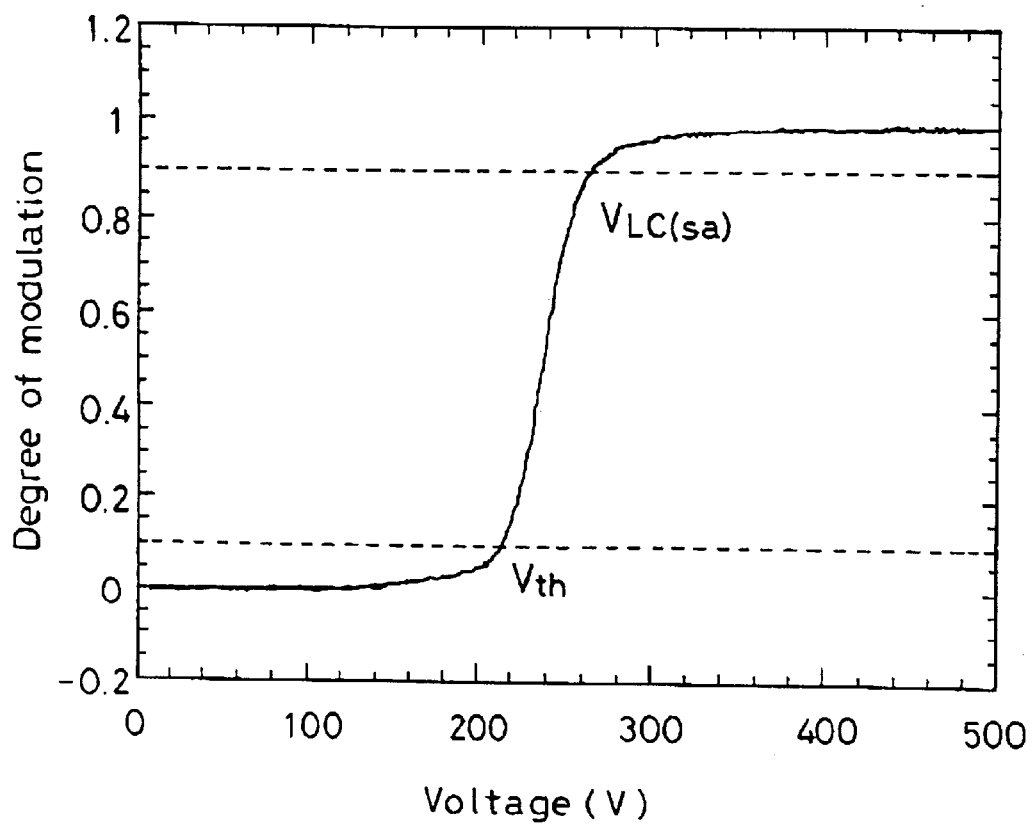
FIG. 11 is a diagram showing the results of the measurement.

The results of the measurement are as shown in FIG. 11. In FIG. 11, voltage is represented on the abscissa and degree of modulation is represented on the ordinate. These are defined by the following equation:

Degree of modulation=$(T-Toff)/(Ton-Toff)$ where

Ton: Signal value in oriented status

Toff: Signal value in non-oriented status

It is now supposed that, when the measurement results are standardized as described above, the voltage $V_{th}$ of the liquid crystal medium when the degree of modulation is 0.1 is threshold voltage, and the voltage $V_{LC(as)}$ of the liquid crystal medium when the degree of modulation is 0.9 is saturation voltage.

Figure 12:
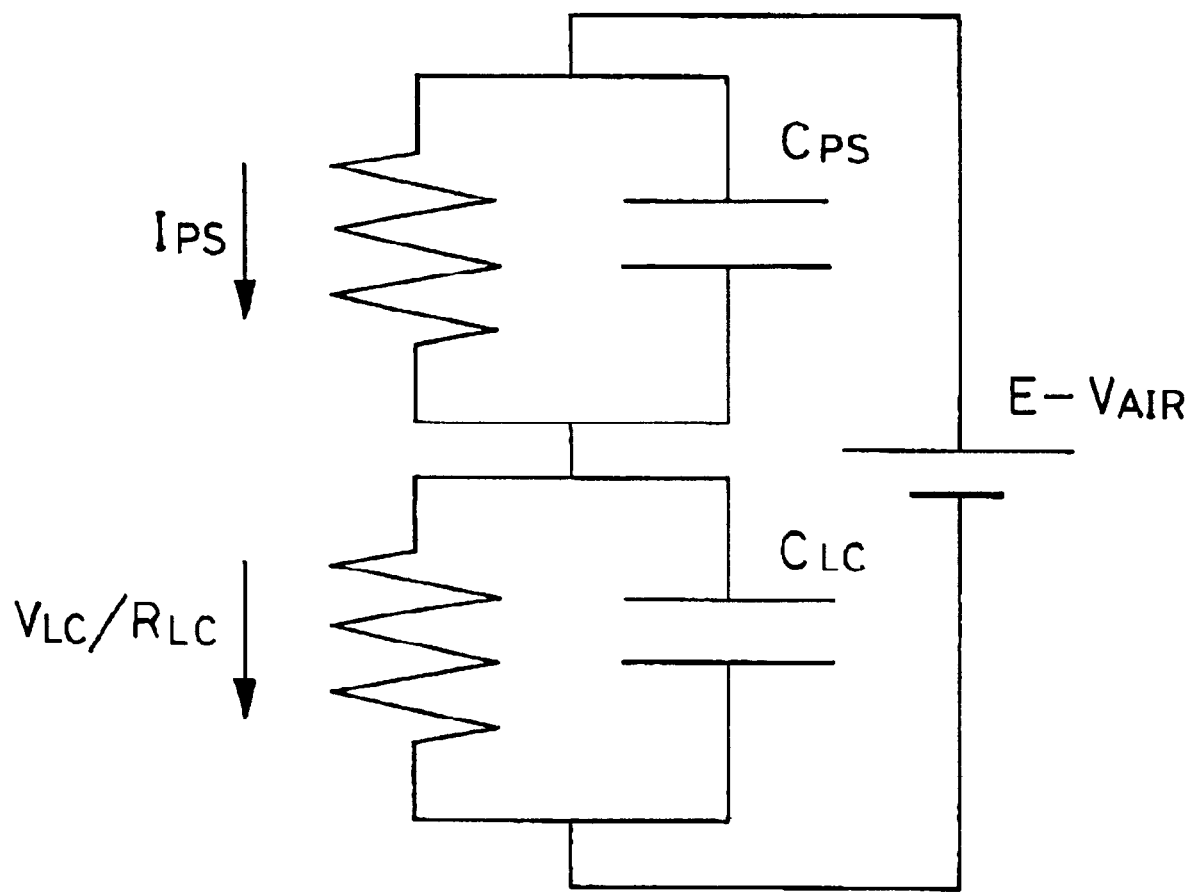
FIG. 12 is a circuit diagram showing an equivalent circuit of a separate type liquid crystal recording medium.

In the image recording system of the present invention, the photo sensor or the liquid crystal medium is considered as a parallel circuit of resistance or capacitor respectively, and each of the se is represented by an equivalent circuit which comprises series circuit as shown in FIG. 12.

As shown in the figure, it is supposed that capacities of the photo sensor and the liquid crystal recording medium are $C_{PS}$ and $C_{LC}$ respectively, that the voltage applied on both ends of the series circuit is $V_{AP}$ (=supply voltage E−air gap voltage $V_{AIR}$), that voltage applied on the photo sensor and the liquid crystal recording medium are $V_{PS}$ and $V_{LS}$ respectively, and that the values of the current flowing in the photo sensor and the liquid crystal recording medium are $I_{PS}$ and $I_{LS}$ respectively, then:

$$V_{AP}=V_{PS}+V_{Air}+V_{LC} \quad (1),$$

where $V_{Air}$: Breakdown voltage (Ex. 400 V)

It is supposed that the resistance of the photo sensor and the liquid crystal recording medium are $R_{PS}$ and $R_{LC}$ respectively, and the voltage of the photo sensor and the voltage of the liquid crystal recording medium at dark portion under equilibrium condition at the elapse of sufficient time after voltage application are called equilibrium voltage and these are referred as $V_{PS(eq)}$ and $V_{LC(eq)}$ respectively. Then, the following relations exist:

$$V_{PS(eq)}/R_{PS}=V_{LC(eq)}/R_{LC} \qquad (2)$$

$$R_{PS}=100/I_{PSd} \qquad (3)$$

Here, $I_{PSd}$ is base current value when voltage of 100 V is applied to the photo sensor. Also, the voltage $V_{LC}(0)$ distributed to the liquid crystal recording medium in initial stage is given by:

$$V_{LC}(0)=(V_{AP}-V_{Air})\cdot C_{PS}/(C_{PS}+C_{LC}) \qquad (4)$$

With regard to the upper limit of the application voltage, if the initial distribution voltage $V_{LC}(0)$ given by the equation (4) is equal to or higher than the threshold voltage, in the system of the present invention, the liquid crystal is oriented before the exposure, and image recording cannot be achieved. If it is supposed that the threshold voltage is 200 V, for example, the initial distribution voltage $V_{LC}(0)$ must be lower than 200 V, or preferably 150 V or lower, or most preferably ½ or less of the threshold voltage. In this way, the voltage distributed to the liquid crystal medium in the initial stage must be lower than the threshold voltage, or more preferably ½ or less of the threshold voltage, and this determines the upper limit of the application voltage.

Thus, the upper limit of the application voltage is determined by capacity and threshold voltage as shown in the equation (4), and it does not depend upon resistance or base current value and is constant. When threshold value increases, the upper limit of the application voltage naturally becomes higher. When the photo sensor becomes thicker, the capacity $C_{PS}$ of the photo sensor decreases according to the equation (4), and the upper limit of $V_{AP}$ increases.

Next, the lower limit of the application voltage is the two voltage values determined by the following two conditions, whichever is higher:
Condition (1): Sum of saturation voltage and breakdown voltage For example, when breakdown voltage is 400 V and saturation voltage is 250 V, the lower limit application voltage is 650 V. When the liquid crystal medium reaches saturation voltage and is to be oriented completely, it is necessary to apply voltage, which is at least a sum of saturation voltage and breakdown voltage because the voltage of the photo sensor is 0 or lower in this case. Specifically, if the voltage applied on the photo sensor is 0, no current flows, and it is necessary to apply the above voltage or higher even at the lowest.
Condition (2): The minimum voltage required in order that the voltage of the liquid crystal medium on the non-exposed portion reaches threshold voltage In a system where the liquid crystal medium and the photo sensor are placed face-to-face with an air gap therebetween and voltage is applied, when sufficient time elapses after voltage application, equilibrium status is reached at a voltage where the current on the photo sensor and the current on the liquid crystal medium at dark portion are equal to each other. The voltage values of the liquid crystal medium and the photo sensor in this case are expressed by the equation (2), and the equilibrium voltage $V_{LC(eq)}$ of the liquid crystal given by the equation (2) must be higher than the threshold voltage. Therefore, if $V_{LC(eq)}$ is obtained in the equation (2), the lower limit of the application voltage $V_{AP}$ in this case is calculated from the equation (1) under the condition:

$$V_{LC(eq)} \geq V_{th},$$

then it is possible to obtain the lowest possible application voltage required, by which the voltage on the liquid crystal medium reaches the threshold voltage.

To obtain $V_{LC(eq)}$ in the equation (2), base current value of the photo sensor does not necessarily have linear characteristics to the voltage. Thus, the relationship between voltage and base current of the photo sensor is determined and is plotted, and $V_{LC(eq)}$ is calculated from the equation (2). Or, in case it is possible to approximate that the relationship between voltage and base current is linear, resistance value may be calculated in the equation (3) from the base current value at a given voltage (e.g. base current value at 100 V), and the above value may be obtained by the same procedure.

Figure 13:
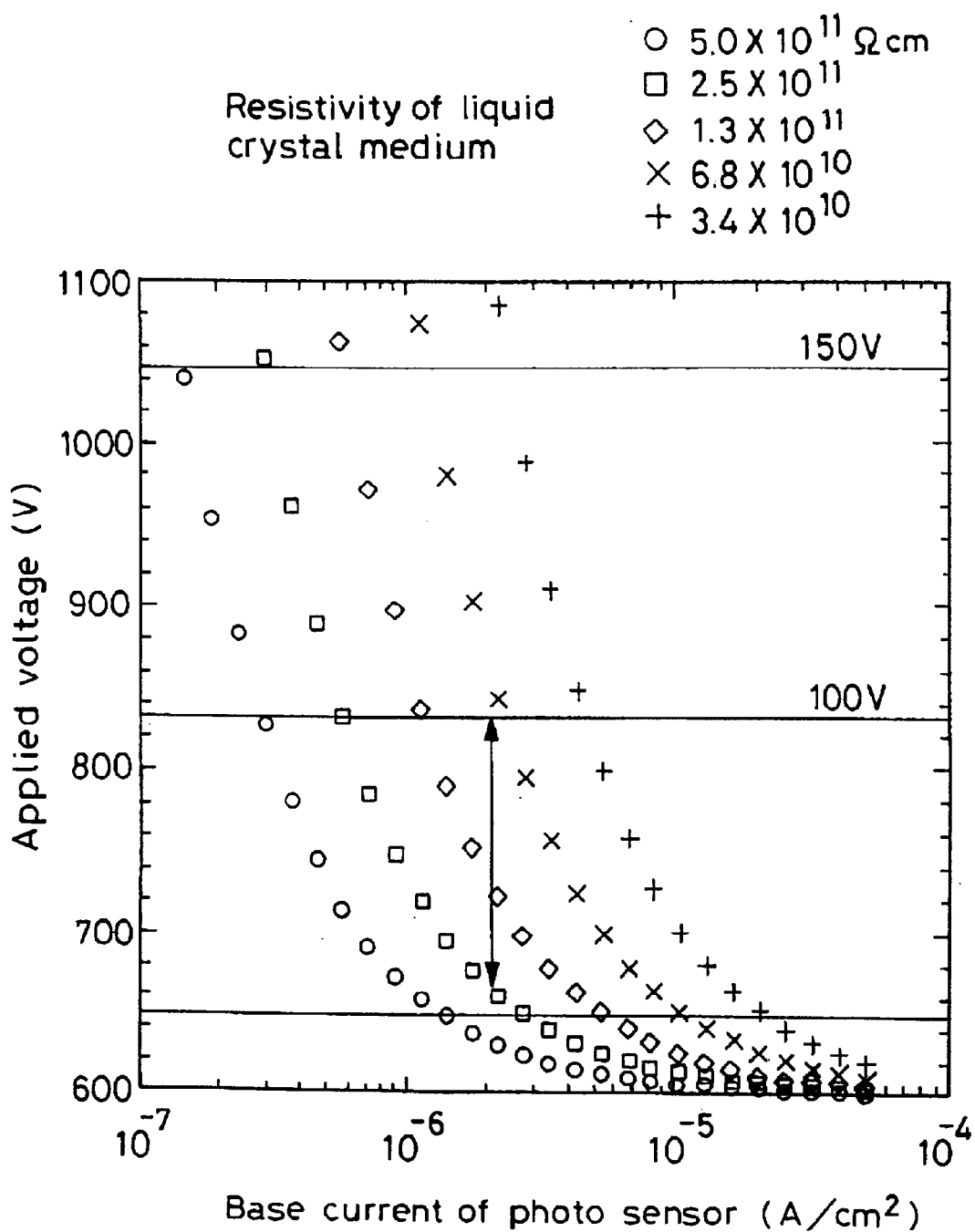
FIG. 13 is a diagram for explaining a method for setting the condition for voltage application.

FIG. 13 shows how the relationship between the base current value when the application voltage is 100 V and the lower limit of the application voltage is calculated. The resistance of the liquid crystal medium has been calculated from resistivity and thickness of the medium. Resistance value of the liquid crystal medium ($\Omega/cm^2$; Film thickness of the, liquid crystal is 6 nm.) is shown on the abscissa, and the application voltage $V_{AP}$ (V) is given on the ordinate. FIG. 13 also shows the results (825 V and 1050 V) when the application voltage V.P is calculated in case the voltage V (0) distributed to the liquid crystal medium in initial stage is 100 V and 150 V respectively. In the figure, resistivity of the liquid crystal medium is given by symbols, where ○ represents $5.0\times10^{11}$ $\Omega$cm, □ represents $5\times10^{11}$ $\Omega$cm, ◇ represents $1.3\times10^{11}$ $\Omega$cm, X represents $6.8\times10^{10}$ $\Omega$cm, and + represents $3.4\times 10^{10}$ $\Omega$cm.

In FIG. 13, in case threshold voltage of the liquid crystal medium is 200 V, the application voltage, at which the voltage distributed in initial stage is ½ of threshold voltage, i.e. 100 V, is 830 V, and this value is the upper limit of the application voltage.

Taking an example in a case where base current of the photo sensor is $2\times10^{-6}$ A/cm$^2$, resistivity of the liquid crystal medium is $2.5\times10^{11}$ $\Omega$cm (in case of □), the lower limit of the application voltage is about 680 V. When voltage lower than this is applied, the voltage of the liquid crystal medium on the non-exposed portion does not reach threshold voltage even when the time of voltage application is extended. Accordingly, the liquid crystal is not oriented, and a satisfactory image cannot be recorded. Therefore, in the case of this combination, the range of the application voltage suitable for image recording is between 630 V–830 V (the range shown by an arrow in the figure), and standard voltage applying condition is: 740 V to 750 V.

In case the same photo sensor is used, and if resistivity of the liquid crystal medium is $5.0\times10^{11}$ $\Omega$cm, the lower limit of the application voltage calculated from resistance value (the above condition (2)) is 630 V. In case an image is recorded at such applied voltage, the condition (2) is satisfied, and the voltage of the liquid crystal medium on the non-exposed portion reaches threshold voltage. Even when strong light is irradiated on the image exposed portion, saturation voltage of the liquid crystal medium cannot be reached, and it is not possible to completely orient the liquid crystal medium. This is not desirable.

When the same photo sensor is used, and if resistivity of the liquid crystal medium is $6.8\times10^{10}$ $\Omega$cm, the lower limit of the application voltage obtained from the condition (2) is higher than the upper limit of the applied voltage obtained from the initial distribution of voltage, and this combination is not suitable for image recording.

In case base current of the photo sensor is $2\times10^{-6}$ A/cm$^2$ and resistivity of the liquid crystal medium is $2.5\times10^{11}$ $\Omega$cm, it is known that the range of the adequate application voltage is 680 V to 830 V. In case the application voltage is 690 V, for example, the voltage applied to the photo sensor is 40 V if the voltage of the liquid crystal medium is saturation voltage, i.e. 250 V. To pass electric current necessary for completely orienting the liquid crystal medium at this voltage, it is necessary to expose the medium to considerably strong light. In case the application voltage is 730 V, voltage twice as high as the above is applied on the photo sensor, and the liquid crystal medium can be oriented by the light weaker than this.

In this way, in case the application voltage is closer to the lower limit of the condition, the voltage applied to the photo sensor becomes lower, and it is necessary to irradiate stronger light. As a result, the exposure range is widened.

As described above, the lower the application voltage is, the wider latitude is, i.e. soft image is obtained, and the higher the application voltage is, the narrower latitude is, i.e. hard image is obtained. Thus, by selecting the application voltage, it is possible to select soft or hard image.

In case resistance value of the liquid crystal medium, base current value of the photo sensor, threshold value and saturation voltage of the liquid crystal, and film thickness of liquid crystal medium and that of photo sensor are changed, the voltage can be set by the same procedure.

The base current value of the photo sensor can be measured immediately before image recording by the method shown in FIG. 7 in the image recording device. The resistance value of the liquid crystal recording medium may be measured in the image recording device similarly to the photo sensor.

The values measured in advance may be used as threshold voltage and saturation voltage of the liquid crystal, and film thickness of liquid crystal medium and that of photo sensor are changed, the voltage can be set by the same procedure.

The base current value of the photo sensor can be measured immediately before image recording by the method shown in FIG. 7 in the image recording device. The resistance value of the liquid crystal recording medium may be measured in the image recording device similarly to the photo sensor.

The values measured in advance may be used as threshold voltage and saturation voltage of the liquid crystal medium.

Figure 1:
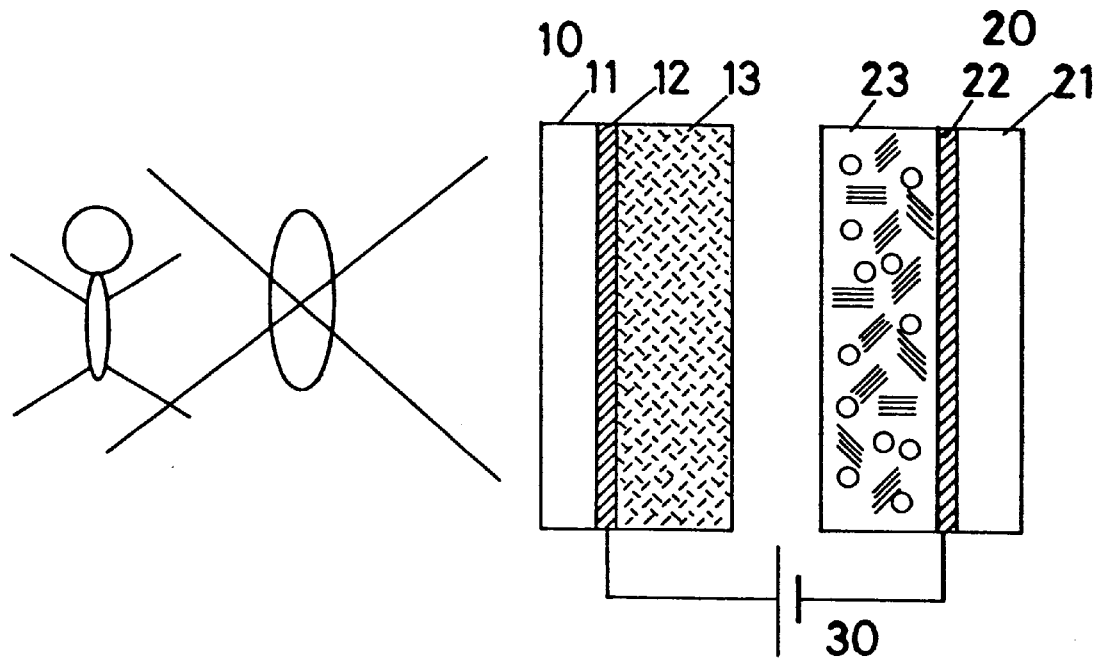
FIG. 1 represents an illutration showing a method for recording an image on a separate type liquid crystal medium.
Figure 2A:
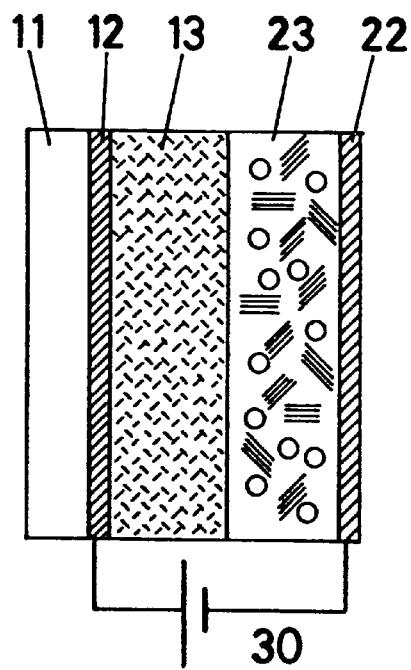
FIGS. 2(a) and 2(b) represent drawings for explaining a method for recording an image on an integrated type liquid crystal medium.
Figure 2B:
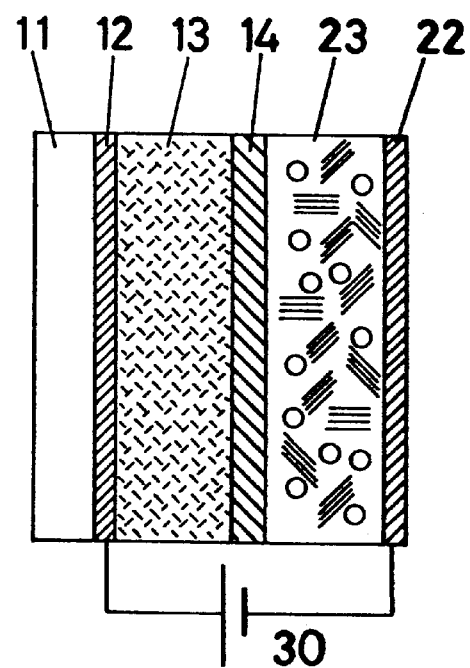
Figure 3:
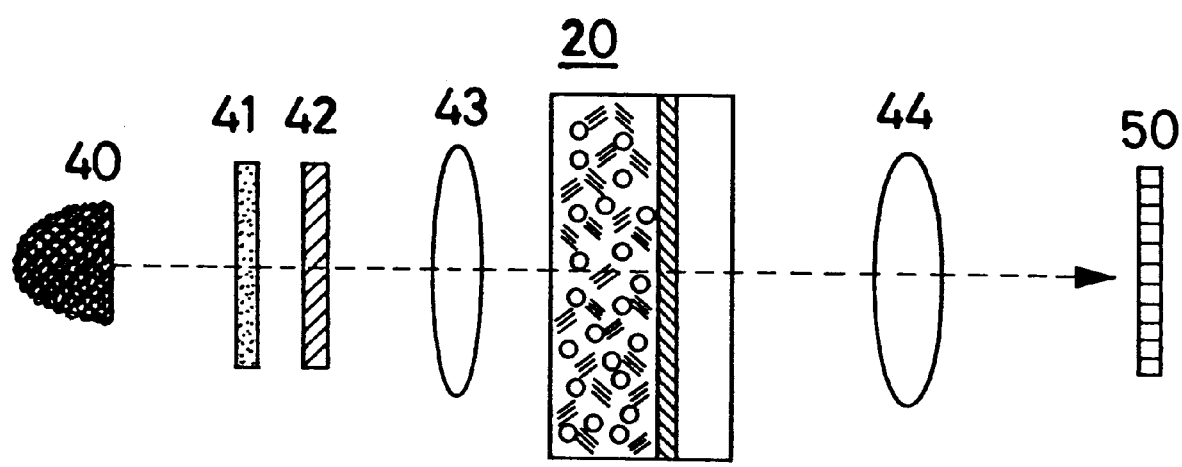
FIG. 3 is a drawing of a method for reading an image.

In the above, description has been given on the case of separate type liquid crystal recording medium. In case the liquid crystal medium and the photo sensor are directly formed on an integrated type liquid crystal recording medium as shown in FIG. 2, the application voltage can be set by the same procedure as in the separate type liquid crystal recording medium by setting the breakdown voltage to 0. In-case a dielectric layer is placed between liquid crystal medium and photo sensor and is laminated, the voltage on the dielectric intermediate layer changes, and this is not necessarily the same as in the case of the separate type. If it is supposed that the dielectric intermediate layer consists of capacitor and resistance and if the change of voltage applied on it is taken into account, it is possible to set the application voltage by the same procedure.

Figure 14:
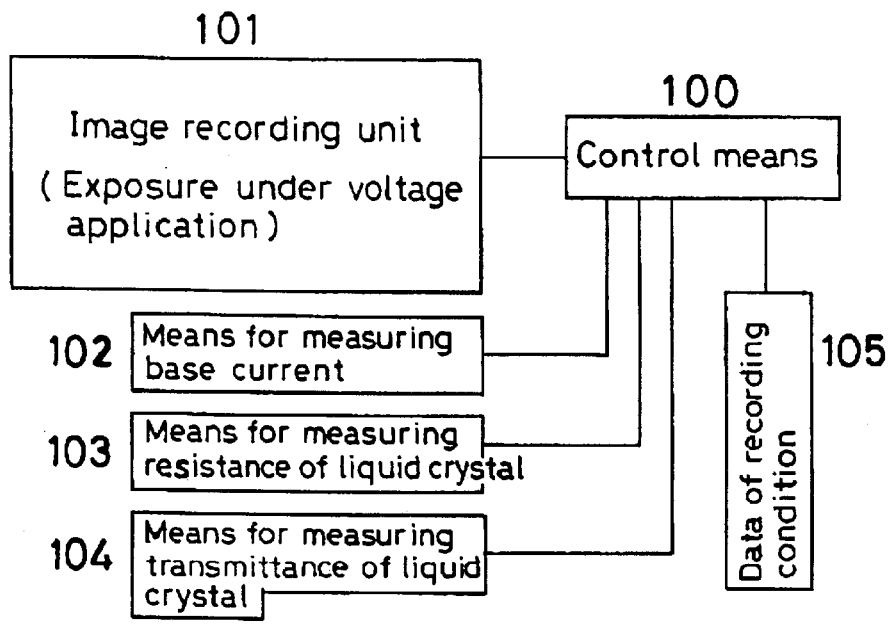
FIG. 14 shows an arrangement of a photographing apparatus.
Figure 15:
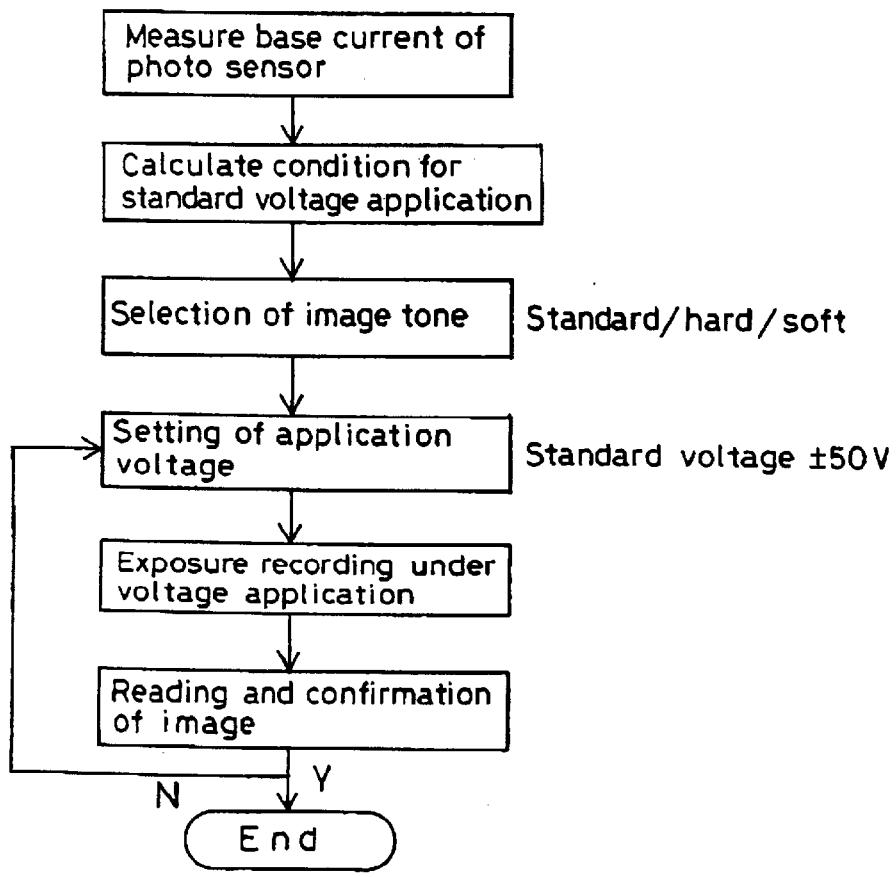
FIG. 15 represents a flow chart for setting application voltage.

Description is now given of an arrangement of a photographing apparatus and of a flow of photographing processing for setting the application voltage, referring to FIGS. 14 and 15.

FIG. 14 shows an arrangement of a photographing apparatus of the present invention.

An image recording unit 101 comprises a separate type or an integrated type liquid crystal recording medium, a photographing optical system, a power source, a switch, etc. A base current measuring means 102 comprises, for example, a measuring device as explained in FIG. 7. A liquid resistance measuring means 103 is arranged, for example, in such manner that an electrode is disposed on the liquid crystal medium, and by applying voltage between this electrode and the transparent electrode of the liquid crystal medium, the flowing current is measured. A liquid crystal transmittance measuring means 104 comprises an apparatus with an arrangement as shown in FIG. 10. A control means 100 comprises a microcomputer and others and it is to incorporate a data 105 such as the measured base current, resistance of liquid crystal, or threshold value, saturation voltage, etc. of the liquid crystal measured in advance and stored, and also, it is to obtain the range of the applied voltage and to control the image recording unit. With regard to the image recording, transmittance of the non-exposed portion is monitored by the liquid crystal transmittance measuring means 104, and voltage application is stopped when this reaches the predetermined value.

Next, description will be given of the flow of photographic processing, referring to FIG. 15.

In the recording apparatus, voltage of 100 V is applied and base current of the photo sensor is measured. Next, using the equations (1) to (4), the lowest application voltage and the range of the application voltage are obtained, at which the initial distribution voltage of the liquid crystal medium is ½ or less of the threshold value. Then, image tone such as soft, hard, standard, etc. is selected. An adequate voltage within the range of the application voltage is set as the standard application voltage, and image recording is performed. In this case, the time of voltage application can be controlled by monitoring transmittance or current value of the liquid crystal to find out that the voltage on the exposed portion has reached the threshold voltage. The image thus recorded is read, and the application voltage is adjusted until the image tone agrees with the desired tone. Then, the image recording is completed.

As described above, it is possible according to the present invention to control recording characteristics of an image to be recorded by changing voltage applying conditions and to record the image by setting the optimal application voltage.

What I claim is:

1. A photographing method, comprising a photo sensor having a photoconductive layer formed on a transparent electrode and a liquid crystal recording medium having a liquid crystal polymer composite layer consisting of a resin and a liquid crystal formed on an electrode, said photo sensor and said liquid crystal recording medium placed face-to-face with an air gap therebetween to form a separate type information recording medium, image exposure is performed to the photo sensor, said liquid crystal is oriented by applying voltage between the two electrodes, and image information is recorded, whereby;

an application voltage, at which initial distribution voltage to the liquid crystal medium determined by capacities of the liquid crystal medium and the photo sensor is ½ or less of threshold voltage of the liquid crystal medium, is defined as an upper limit application voltage;

a sum V1 of saturation voltage of the liquid crystal medium and breakdown voltage, or an application voltage V2 where equilibrium potential of the liquid crystal medium obtained from resistance of the photo sensor based on base current of the photo sensor and from resistance of the liquid crystal medium is higher than the threshold voltage, whichever is higher, is defined as a lower limit application voltage; and an image is recorded by setting the application voltage between the upper limit application voltage and the lower limit application voltage.

2. A photographing method according to claim 1, wherein image characteristics are controlled by changing the application voltage within said preset range.

3. A photographing apparatus, comprising a photo sensor having a photoconductive layer formed on a transparent electrode and a liquid crystal recording medium having a liquid crystal polymer composite layer consisting of resin and liquid crystal formed on an electrode, said photo sensor and said liquid crystal recording medium placed face-to-face with an air gap therebetween to form a separate type information recording medium, image exposure is performed to the photo sensor, said liquid crystal is oriented by applying voltage between the two electrodes, and image information is recorded, whereby there are provided:

means for measuring resistance of the liquid crystal medium, means for determining base current of the photo sensor, and control means for setting application voltage range;

said control means calculates an upper limit application voltage, defined as a voltage, at which initial distribution voltage to the liquid crystal medium determined by capacities of the liquid crystal medium and the photo sensor is ½ or less of the threshold voltage of the liquid crystal medium, and also calculates a lower limit application voltage defined as a sum V1 of saturation voltage of the liquid crystal medium and breakdown voltage, or an application voltage V2 where equilibrium potential of the liquid crystal medium obtained from resistance of the photo sensor based on base current of the photo sensor and from resistance of the liquid crystal medium is higher than the threshold voltage, whichever is higher, and the application voltage is controlled within the range of said upper limit application voltage and said lower limit application voltage.

* * * * *